(12) United States Patent
Song et al.

(10) Patent No.: US 8,151,107 B2
(45) Date of Patent: Apr. 3, 2012

(54) METHOD AND SYSTEM FOR DETECTING CONCURRENT LOGINS

(75) Inventors: Gyehan Song, Gyeonggi-do (KR); Seonghun Kim, Seoul (KR)

(73) Assignee: NHN Corporation, Seongnam-si (KR)

( * ) Notice: Subject to any disclaimer, the term of this patent is extended or adjusted under 35 U.S.C. 154(b) by 1082 days.

(21) Appl. No.: 11/943,951

(22) Filed: Nov. 21, 2007

(65) Prior Publication Data

US 2008/0065879 A1    Mar. 13, 2008

Related U.S. Application Data

(63) Continuation of application No. PCT/KR2006/001976, filed on May 25, 2006.

(30) Foreign Application Priority Data

May 31, 2005   (KR) .......................... 10-2005-0046028

(51) Int. Cl.
*H04L 9/00* (2006.01)
(52) U.S. Cl. ........ 713/155; 713/168; 713/170; 709/203; 709/225; 709/226; 709/227; 709/228; 709/229; 705/65
(58) Field of Classification Search ................. 713/155, 713/168, 170
See application file for complete search history.

(56) References Cited

U.S. PATENT DOCUMENTS

| 6,314,449 B1 | 11/2001 | Gallagher et al. | |
| 7,028,073 B1 * | 4/2006 | Bui et al. ....................... | 709/203 |
| 7,437,457 B1 * | 10/2008 | Eisendrath et al. ........... | 709/225 |
| 2005/0015601 A1 * | 1/2005 | Tabi .............................. | 713/182 |
| 2005/0246288 A1 * | 11/2005 | Kimura et al. .................. | 705/65 |

FOREIGN PATENT DOCUMENTS

| CA | 2325153 | 5/2002 |
| JP | 2002-094710 | 3/2002 |
| JP | 2002-189646 | 7/2002 |
| KR | 11-212917 | 8/1999 |
| KR | 10-2000-0033426 | 6/2000 |
| KR | 10-2002-0000520 | 3/2002 |

* cited by examiner

*Primary Examiner* — Brandon Hoffman
*Assistant Examiner* — Samuel Ambaye
(74) *Attorney, Agent, or Firm* — H.C. Park & Associates, PLC

(57) ABSTRACT

Concurrent login detection system includes: a message receiving unit configured for receiving a log message which is indicative of a user identifier of a user, login/logout state of the user, and a session identifier, from an external server; a corresponding message retrieval unit configured for retrieving a corresponding message of the received log message from a memory wherein the corresponding message is a log message containing the same user identifier and the same session identifier with those contained in said received log message; and a message processor configured for removing said received log message and said retrieved corresponding message from the memory if the corresponding message is retrieved from the message buffer, and for storing said received log message in the memory if said corresponding message is not retrieved from the memory.

17 Claims, 7 Drawing Sheets

| USER ID | CHANNEL ID | SESSION ID | USER'S LOGIN/ LOGOUT STATE |
|---|---|---|---|
| SSS777 | 4 | 89 | LOGIN |
| SSS777 | 4 | 89 | LOGOUT |

FIG. 7

<<USER BUFFER(700)>>

| USER ID | CHANNEL ID | SESSION ID | USER'S LOGIN/ LOGOUT STATE | TIME STAMP (SEQUENCE NO /SERVER) |
|---|---|---|---|---|
| SSS777 | 10 | 99 | LOGIN | 78/LCS1 |
| SSS777 | 4 | 89 | LOGIN | 77/LCS1 |
| SSS777 | 5 | 1004 | LOGIN | 45/LCS1 |
| ... | ... | ... | ... | ... |

<<BANISHMENT CANDIDATE LIST(710)>>

| USER ID | CHANNEL ID | SESSION ID | USER'S LOGIN/ LOGOUT STATE | TIME STAMP (SEQUENCE NO /SERVER) |
|---|---|---|---|---|
| SSS777 | 10 | 99 | LOGIN | 78/LCS1 |
| SSS777 | 4 | 89 | LOGIN | 77/LCS1 |
| ... | ... | ... | ... | ... |

METHOD AND SYSTEM FOR DETECTING CONCURRENT LOGINS

CROSS-REFERENCE TO RELATED APPLICATION

This application is a continuation of prior International Application PCT Application No. PCT/KR2006/001976 filed on May 25, 2006, which claims the benefit of priority from Korean Patent Application No. 10-2005-0046028 filed on May 31, 2005. The disclosures of International Application PCT Application No. PCT/KR2006/001976 and Korean Patent Application No. 10-2005-0046028 are incorporated herein by reference.

BACKGROUND OF THE INVENTION

1. Field of the Invention

The present invention relates to a concurrent login detection system, and more particularly, to concurrent login detection method and system which can detect concurrent logins with a single user account, into a distributed server, and provide information on a current location where the user utilizes the service.

2. Description of Related Art

According to a conventional art, a user authentication database is maintained for each web server which provides a predetermined service, and when a user logs into the web server, the web server receives a user identifier and a password of the user. Also, login information of the user identifier is retrieved to determine whether the user's login is concurrent login is determined. In this instance, the login information of the user identifier is stored in the user authentication database. Also, when the user's login is the concurrent login, the later login is blocked. This is to prevent a plurality of users from utilizing an identical service with a single user identifier.

However, according to the conventional art, the concurrent login interruption is managed for each server. Accordingly, the concurrent user access may not be easily managed in a system which includes and operates a plurality of servers. Specifically, when a user double logs in a plurality of servers which simultaneously maintain the user's log information, via an identical user identifier, the concurrent login may not be processed.

FIG. 1 is diagram illustrating a network connection of a user terminal and a plurality of servers according to the conventional art.

Referring to FIG. 1, a user may access a first game server 101, a second game server 102, or a third game server 103 using a first user terminal 105 and a second user terminal 106, and utilize a service of the game server. In this instance, the first game server 101, the second game server 102, and the third game server 103 are external servers which are connected to a network 104.

Also, the user may utilize all of the first game server 101, the second game server 102, and the third game server 103, using a single user identifier. As an example, when the user accesses a game site using the single user identifier, the user may utilize various types of games, such as a poker game in the first game server 101, a GOSTOP game in the second game server 102, and a Tetris game in the third game server 103, using the single user identifier.

However, since each game server provides a corresponding game service, and a user authentication was also performed in the each game server, a different user was able to log in a different game server and utilize a game service using a single user identifier.

As an example, it was possible that the user logged in the first game server 101 via the first user terminal 105, and another user simultaneously logged into the second game server 102 via the second user terminal 106 using the identical user identifier and utilized the game service. To solve this problem, a method of periodically checking logged in user identifiers with respect to all game servers and determining a concurrent login was utilized. However, in this case, the concurrent login was not immediately handled.

Also, as described above, different game servers provide different game services respectively. As an example, a user A utilizes a game service which is provided from the first game server 101, and a user B utilizes a game service which is provided from the second game server 102. In this case, when the user A request location information of the user B, location information may not be provided since the user A and the user B are not utilizing the game service in an identical server. Accordingly, as shown in FIG. 2, a method of installing a location server which manages logins/logouts of a plurality of servers was suggested.

FIG. 2 is a diagram illustrating a network connection of connecting a plurality of servers and a location server which manages logins/logouts according to the conventional art.

As shown in FIG. 2, a method of managing login/logout information in a single location by installing a location server 207 which manages logins/logouts of a plurality of servers was suggested to provide location information. Namely, a first game server 201, a second game server 202, and a third game server 203 are connected to the location server 207 via a network 204. When the first game server 201, the second game server 202, and the third game server 203 transmit the user's login information to the location server 207, as a log message, the location server 207 manages the user's log information.

The above method may identify concurrent login. However, when the first game server 201, the second game server 202, and the third game server 203, i.e. external servers, transmit login/logout messages to the location server 207, it is not guaranteed that the login/logout messages sequentially arrive at the location server 207. Accordingly, a method of processing a concurrent login considering a message's arrival order is required.

FIG. 3 is a diagram illustrating a user's log order in an external server and an order that a log message transmitted from the external server arrives at a location server according to the user's login/logout.

As an example, a user A may repeat login and logout in a plurality of external servers where the user A may login using a single user identifier. In this case, according to the conventional art, the user's login messages and logout messages are transmitted from each of the plurality of external servers to a location server. In this instance, as indicated by a reference numeral 301, the user logged in at a time T1, logged out at a time T2. Also, the user logged in at a time T3, and logged out at a time T4, and logged in at a time T5. Accordingly, the user's final login/logout state is a login state.

However, when transmitting the user's log messages from the server where the user repeatedly logged in and logged out, to the location server, it is not guaranteed that the user's log messages sequentially arrive at the location server in a transmission order. Accordingly, when the log message arrives at the location server in an inverted order, the user's login/logout state may not be accurately detected.

Namely, as indicated by a reference numeral 302, the logout message which is generated at the time T4 and the login message which is generated at the time T5 arrived at the location server in an inverted order. In this case, when the location server processes the log messages in a received order, the user's current state may be determined as a logout state although the user's current state is a login state.

Accordingly, a method and system is required, which can accurately determine a user's current login/logout state, although login messages transmitted from a plurality of service servers do not sequentially arrive at a location server in a transmission order, when aggregating and managing the user's login/logout information with respect to the plurality of service servers in the location server.

Also, according to the conventional art, log information is processed using only a user identifier of a transmitted log message. Accordingly, when the log message arrives at a service server, it is impossible to recognize in which server login/logout information was generated. Also, it is impossible to detect a place where the user is utilizing the service.

BRIEF SUMMARY

The present invention provides a concurrent login detection method and system which can accurately determine a user's current login/logout state, although log messages transmitted from a plurality of service servers do not sequentially arrive at a location server in a transmission server, when aggregating and managing the user's login/logout information with respect to the plurality of service servers in the location server.

The present invention also provides a concurrent login detection method and system which can maintain a message buffer for each user identifier, recognize a server identifier, a channel identifier, and a session identifier of a transmitted log message, and thereby, determine the user's concurrent logins, and also can detect a user who double logs in a distributed server via a single user identifier and utilizes a service.

The present invention also provides a concurrent login detection method and system which can delete a log message corresponding to a logout message from a forced logout candidate list, and compulsorily terminate remaining concurrent user access messages by transmitting a forced logout message when at least two concurrent user access messages with respect to an identical user are transmitted, and in this instance, a logout message with respect to one of the at least two concurrent user access message is received, and thereby, can effectively process the concurrent user access messages.

The present invention also provides a concurrent login detection method and system which can select an earliest logged in login message from double logged in messages using a time stamp, and banish double logged in users by transmitting a forced logout message to remaining login messages, and thereby, can prevent a concurrent user access.

The present invention also provides a concurrent login detection method and system which can maintain a user buffer storing a log message, which includes a server identifier, a channel identifier, and a session identifier, for each user identifier, and provide session identifier information of the user when a request for location of the user is received, and thereby, can provide location information of a server and a channel that a user is currently logged into and utilizes a service although users logged into a plurality of servers.

According to an aspect of the present invention, there is provided a system for detecting concurrent logins, the system including: a message receiving unit configured for receiving a log message which is indicative of a user identifier of a user, login/logout state of the user, and a session identifier, from an external server; a corresponding message retrieval unit configured for retrieving a corresponding message of the received log message from a memory wherein the corresponding message is a log message containing the same user identifier and the same session identifier with those contained in said received log message; and a message processor configured for removing said received log message and said retrieved corresponding message from the memory if the corresponding message is retrieved from the message buffer, and for storing said received log message in the memory if said corresponding message is not retrieved from the memory.

According to another aspect of the present invention, there is provided a system for detecting a user's concurrent logins, the system including: a message receiving unit receiving a log message comprising the user's user identifier, the user's login/logout state, and a session identifier, from an external server; a corresponding message retrieval unit retrieving a corresponding message of the log message from a user buffer; and a message processor deleting the log message and the retrieved corresponding message from the user buffer when the corresponding message is retrieved from the user buffer, and storing the log message in the user buffer when the corresponding message is not retrieved from the user buffer.

According to still another aspect of the present invention, there is provided a method of detecting a user's concurrent logins, the method including: receiving a log message from a service server wherein the log message is indicative of a user identifier of a user, login/logout state of the user, and a session identifier, from an external server; retrieving a corresponding message of the log message from a memory wherein the corresponding message is a log message containing the same user identifier and the same session identifier with those contained in said received log message; and removing the received log message and the retrieved corresponding message from the memory if the corresponding message is retrieved from the memory, and storing the received log message in the memory if the corresponding message is not retrieved from the memory.

BRIEF DESCRIPTION OF THE DRAWINGS

FIG. 7 is a diagram illustrating an example of a user buffer and a forced logout candidate list according to an embodiment of the present invention;

DETAILED DESCRIPTION OF EMBODIMENTS

Figure 1:
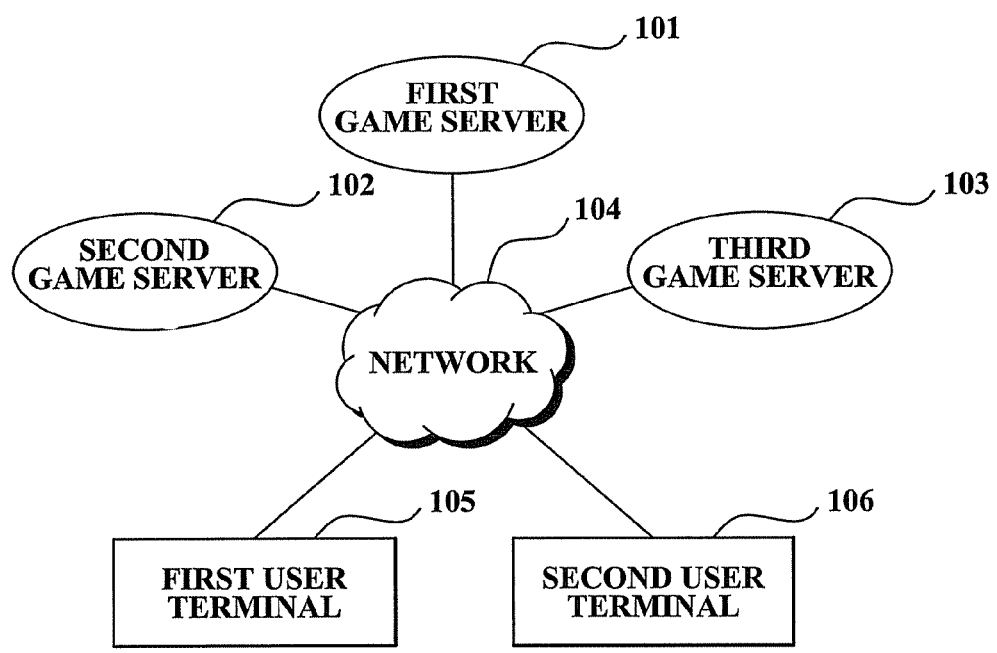
FIG. 1 is a diagram illustrating a network connection of a user terminal and a plurality of servers according to a conventional art.
Figure 2:
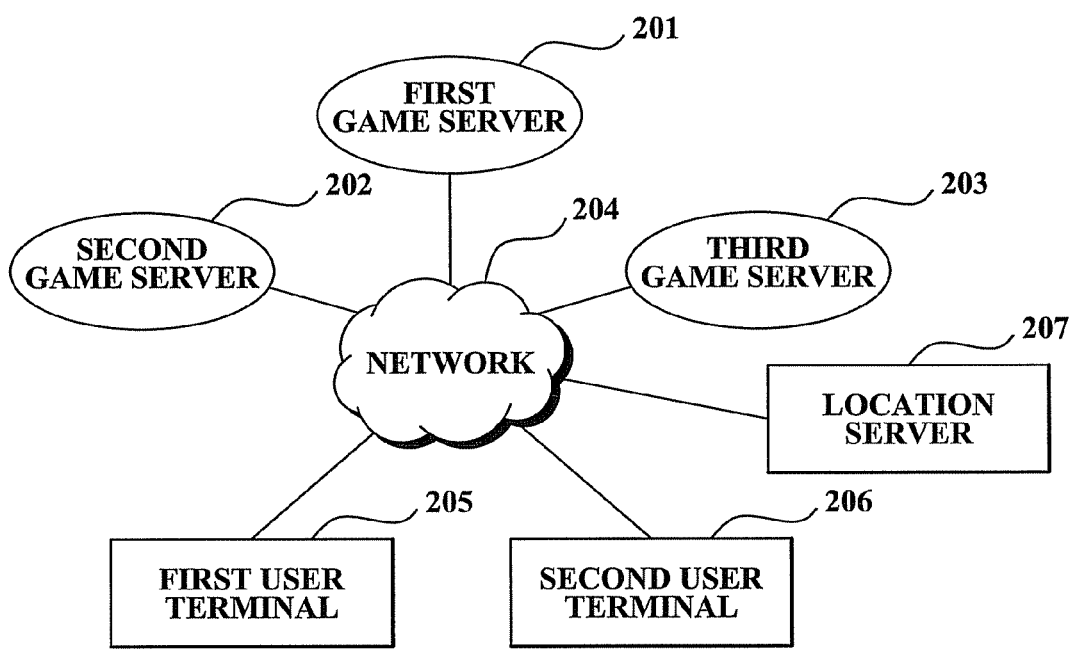
FIG. 2 is a diagram illustrating a network connection of connecting a plurality of servers and a location server which manages logins/logouts according to the conventional art.
Figure 3:
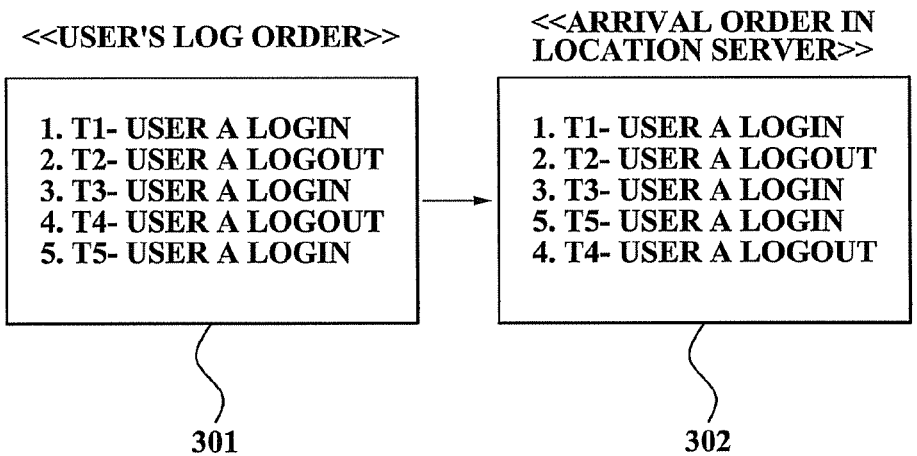
FIG. 3 is a diagram illustrating a user's log order in an external server and an order that a log message transmitted from the external server arrives at a location server according to the user's login/logout.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

As used in this application, the terms "unit" and "system" are intended to refer to a computer-related entity, either hardware, a combination of hardware and software, software, or software in execution. For example, a unit can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a module. One or more units can reside within a process and/or thread of execution, and a module or unit can be localized on one computer and/or distributed between two or more computers.

Figure 4:
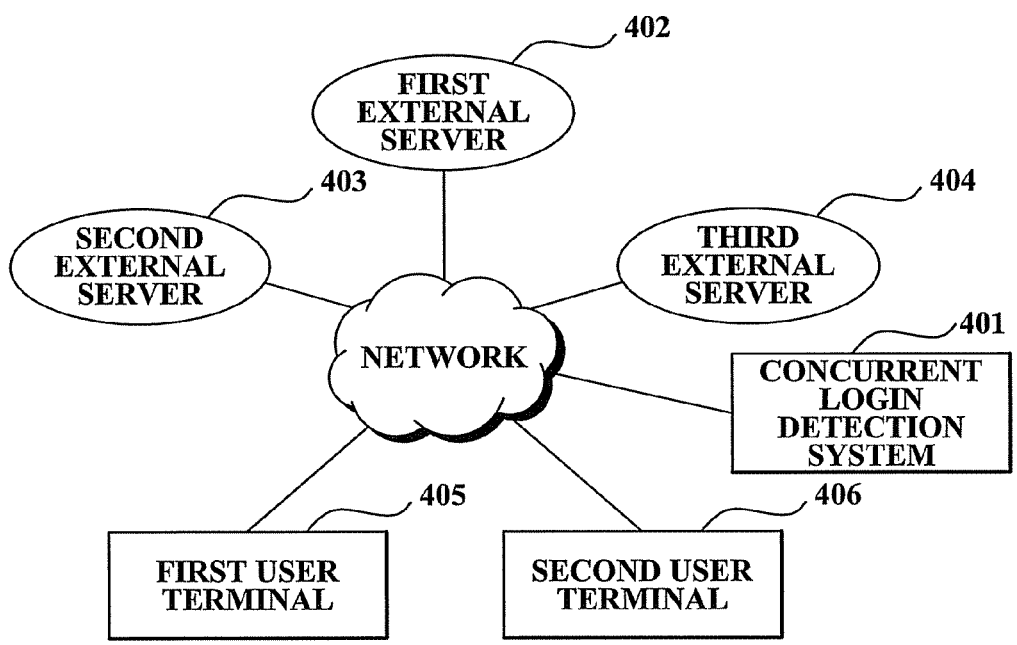
FIG. 4 is a diagram illustrating a network connection of a concurrent login detection system according to an embodiment of the present invention.

FIG. 4 is a diagram illustrating a network connection of a concurrent login detection system 401 according to an embodiment of the present invention. The concurrent login detection system is connected to external servers 402, 403, and 404 via a wired/wireless network. The external servers 402, 403, and 404 are connected to a first user terminal 405 and a second user terminal 406 and provide a predetermined service thereto via the wired/wireless network. As an example, the external servers 402, 403, and 404 may be game servers which provide an online game service, and also may perform a user login and/or a user logout respectively.

Hereinafter, an embodiment that the concurrent login detection system 401 is connected to the plurality of external servers 402, 403, and 404 will be described, but the present invention is not limited thereto. The present invention may be applied even to a single external server. Also, the concurrent login detection system 401 may be replicated and constructed as a plurality of servers to reduce system loads.

Also, the concurrent login detection system 401 may be included in a location server. An authentication process of a user's login/logout may be performed in the external servers 402, 403, and 404. Also, the authentication process may be performed in the concurrent login detection system 401.

The external servers 402, 403, and 404 may provide the user's login/logout state to a service server which provides a predetermined service to the user or the location server which includes the concurrent login detection system 401, in inter-operation with the concurrent login detection system 401.

In this instance, the external server 402, 403, or 404 provides a service to a user terminal via a network. Examples of the external server 402, 403, or 404 may include a game server providing a predetermined game to the user, a music server providing an audio file, and a blog server providing a blog service.

Figures 5, 6:
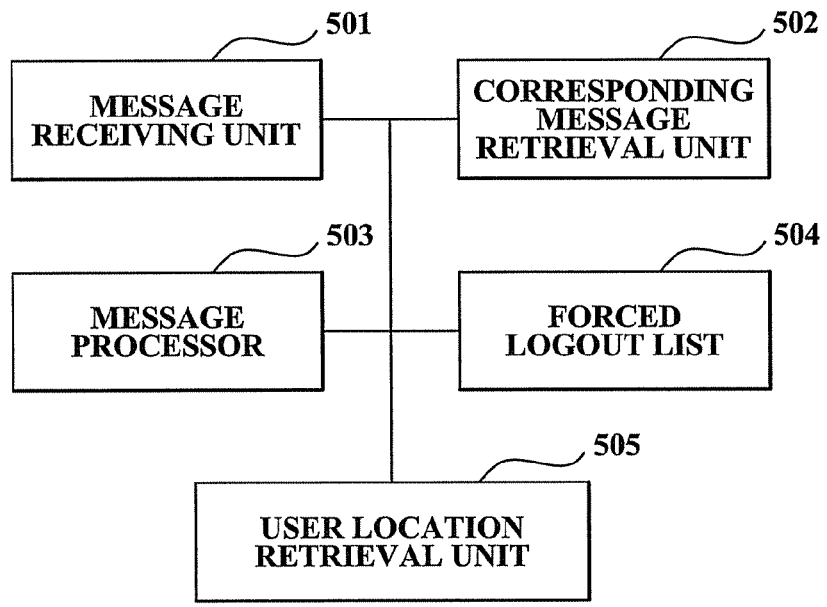
FIG. 5 is a block diagram illustrating a configuration of a concurrent login detection system according to an embodiment of the present invention.
FIG. 6 is a diagram illustrating an example of a log message and a corresponding message according to an embodiment of the present invention.

FIG. 5 is a block diagram illustrating a configuration of a concurrent login detection system according to an embodiment of the present invention. Referring to FIG. 5, the concurrent login detection system includes a message receiving unit 501, a corresponding message retrieval unit 502, a message processor 503, a user forced logout unit 504, and a user location retrieval unit 505.

The message receiving unit 501 receives a log message from an external server. The log message includes a user's user identifier, the user's login/logout state, a channel identifier of a channel which is logged in/logged out by the user, and a session identifier. In this instance, when only one channel exists, the channel identifier may not be included in the log message. Hereinafter, the log message will be described with reference to FIG. 6.

FIG. 6 is a diagram illustrating an example of a log message and a corresponding message according to an embodiment of the present invention. Referring to FIG. 6, the log message according to the present embodiment includes a user identifier 601, a channel identifier 602 of a channel which is logged in/logged out by a user, a session identifier 603, and the user's login/logout state 604.

The user identifier 601 is utilized for identifying a user who has logged in or logged out to utilize a predetermined service.

The channel identifier 602 is utilized for identifying a location where the user logged in or logged out. In this instance, the channel identifier 602 may be information on an external server where the user logged in or logged out. Also, the channel identifier 602 may be information that is utilized for identifying the user's logged in or logged out service. According to an embodiment of the present invention, when a game server is utilized for the external server, the game server provides a service via various channels. As an example, the game server provides an online chess game service via 10 channels, and the user accesses the game server, selects a channel to utilize the game service, and utilizes the game service. In this case, the channel identifier 602 is defined as an identifier for identifying the game server and the channel in the game server.

In this instance, as described above, when only one channel exists, the channel identifier 602 may not be included. As an example, when the user is logged in only one location to utilize a service, the channel identifier 602 may not be necessarily included in a log message. In this case, the log message includes the user identifier 601, the channel identifier 602, the session identifier 603, and the user's login/logout state 604.

The session identifier 603 is a unique identifier which the external server assigns to the user's single session. Namely, the session identifier 603 may be identification information with respect to the single session which is assigned to the user from when the user logs into and until the user logs out of the external server. Also, the session identifier 603 may include a positive number of four bytes. As an example, when a user A logs into an external server, a single session identifier is allocated to the user. The assigned session identifier is uniquely maintained while the user A utilizes the service, until the user A logs out of the external server. When the user A logs out of and again logs into the external server, an additional session identifier is assigned to the user A. Also, when another user logs into the external server, another session identifier is assigned to the other user. Accordingly, only a login and logout pair having an identical session identifier exists in a single external server. Also, since session identifiers are independently managed in each external server, a different external server may have a login/logout pair with the identical session identifier.

The user's login/logout state 604 indicates whether the user accessed a webpage or an application which is provided from the external server and logged in or logged out.

In this instance, the login state indicates that the user accessed the webpage or the application provided from the external server, and inputted a selection via a user interface to utilize a service provided from the external server. As an example, the user may input a user identifier and a password in the webpage of a game server which is the external server, and thereby, log into the game server.

Also, the logout state is an identifier of the user when the user logged in the webpage or the application of the external server, and in this instance, performed a logout. Accordingly, the logout state indicates that the user is not utilizing the service in the external server. As an example, when the user logged in the external server, the user may log out of the external server by selecting the logout of the webpage in the external server.

Hereinafter, a message that the user state is a login is defined as a login message, and a message that the user' state is a logout is defined as a logout message. As an example, in FIG. 6, a log message 605 indicates the login message, and another log message 606 indicates the logout message.

Referring again to FIG. 5, the corresponding message retrieval unit 502 retrieves a corresponding message of the log message from a message buffer.

The corresponding message is a log message having a user identifier, a channel identifier, and a session identifier identical to the log message, and having a user's login/logout state opposite to the log message. According to embodiments, when the channel identifier is not included in the log message, the corresponding message is a log message having a user identifier and a session identifier identical to the log message, and having a user's login/logout state opposite to the log message.

As an example, in FIG. 6, the log message 605 and the another log message 606 have the identical user identifier 601, the identical channel identifier 602, and the identical session identifier 603, but the opposite of the user's login/logout state 604. Accordingly, the another log message 606 become a corresponding messages of the log message 605.

Referring to FIG. 6, the other log message 606, i.e. the corresponding message, has the user identifier 601 "SSS777", the channel identifier 602 "4", and the session identifier 603 "89" identical to the log message 605, having the user's login/logout state 604 opposite to the log message 605. Specifically, the user's login/logout state 604 of the log message 605 is "login" which corresponds to "logout" of the other log message 606.

The message buffer is a storage unit which stores the log message or the corresponding message received from the concurrent login detection system. Also, according to embodiments, the message buffer may include a user buffer which is allocated to each user. As described above, when the user buffer is managed for each user identifier, the log message is divided and stored for each user. Accordingly, the log message corresponding to each user may be very quickly stored and retrieved.

FIG. 7 is a diagram illustrating an example of a user buffer 700 and a forced logout candidate list 710 according to an embodiment of the present invention. Referring to FIG. 7, the user buffer 700 stores log messages or corresponding messages 701, 702, and 703 for each user identifier in an order that the log messages or the corresponding messages 701, 702, and 703 arrive at the user buffer 700. Also, each of the log messages or the corresponding messages 701, 702, and 703 may further include a time stamp 704.

When the message buffer maintains the user buffer 700 corresponding to the user identifier as shown in FIG. 7, the corresponding message retrieval unit 502 identifies the user buffer 700 corresponding to the user identifier in the message buffer by referring to the user identifier of the received log message, and retrieves the corresponding message of the log message from the user buffer 700.

As an example, when a user identifier of a received log message is "SSS777", a channel identifier thereof is "5", a session identifier thereof is "1004", and a user's login/logout state thereof is "logout", the corresponding message retrieval unit 502 identifies the user buffer 700 corresponding to the user identifier "SSS777". Also, as indicated by the corresponding message 701, the corresponding message retrieval unit 502 retrieves a message whose user identifier is "SSS777", channel identifier is "5", session identifier is "1004", and user's login/logout state is "login", as a corresponding message of the log message, from the user buffer 700.

Also, even when receiving the log messages 702 and 703, the corresponding message retrieval unit 502 may retrieve a corresponding message corresponding to each of the received log messages 702 and 703.

In this instance, the corresponding message corresponding to each of the log messages 702 and 703 is a log message having a user identifier, a channel identifier, and a session identifier identical to the log message, and having a user's login/logout state opposite to the log message.

The message processor 503 deletes the log message and the retrieved corresponding message from the message buffer when the corresponding message is retrieved from the message buffer, and stores the log message in the message buffer when the corresponding message is not retrieved from the message buffer.

Accordingly, as described above, when the corresponding message 701 exists with respect to the received log message whose user identifier is "SSS777", channel identifier is "5", session identifier is "1004", and user's login/logout state is "logout", the message processor 503 deletes the corresponding message 701 from the message buffer. When the corresponding message 701 is not retrieved from the message buffer, the message processor 503 stores the log messages 702 and 703 in the message buffer.

As described above, according to the present invention, a corresponding message must be retrieved and processed by using a channel identifier, a session identifier, and a user's login/logout state of the log message. Accordingly, even when a login/logout message does not arrive in an order of a user's login/logout, the login/logout message may be effectively processed.

Specifically, although the login/logout message corresponding to the user identifier does not arrive in an order that the user logged into or logged out of the external server, the corresponding message corresponding to the channel identifier, the session identifier, and the user's login/logout state of the log message may be retrieved from the user buffer, and quickly processed.

Figure 8:
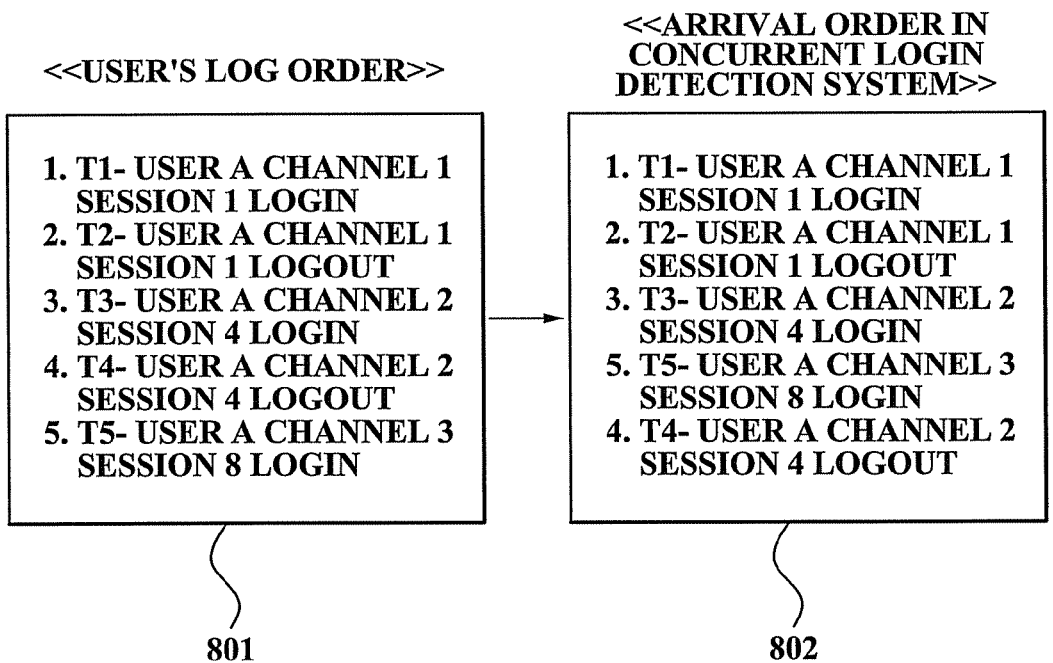
FIG. 8 is a diagram illustrating a user's log order in an external server and an order that a log message arrives at a login detection system in the log order.

FIG. 8 is a diagram illustrating a user's log order in an external server and an order that a log message arrives at a login detection system in the log order.

Referring to a reference numeral 801 of FIG. 8, when a user A logged in or logged out the external server at each T1 through T5 time, a final log state indicates that the user A logged into a channel 3 and a session 8 at the time T5.

However, the external server generates log information of the user A as a log message, and transmits the generated log information to the concurrent login detection system. In this instance, an order of the log message may be changed during the transmission process. Specifically, referring to a reference numeral 802, the user A logged out a channel 2 and a session 4 at the time T4, and logged in the channel 3 and the session 8 at the time T5. In this case, the login message at the time T5 may initially arrive prior to the logout message at the time T4.

In this case, according to the conventional art, a log message which arrives in an inverted order is not processed. However, according to the present invention, the log message may be processed by identifying a corresponding message corresponding to the log message. Accordingly, although the log message arrives in an inverted order as described above, the log message may be processed.

Specifically, as indicated by the reference numeral 802, when the logout message that the user A logged out at the time T4 arrived later than the login message that the user A logged in at the time T5, the concurrent login detection system stores the login message in the message buffer, since a corresponding message corresponding to the login message is not stored in the message buffer. Also, the concurrent login detection system deletes the login message at the time T3 from the message buffer, since the login message at the time T3, that is the corresponding message of the logout message at the time T4, is stored in the message buffer.

Accordingly, according to the present invention, although log messages arrive in an inverted order, a final log state may be accurately verified that the user A logged in the channel 3 and the session 8 at the time T5.

Namely, according to the present invention, although a log message about a user's login/logout is received in an inverted order, the log message may be accurately processed by using a channel identifier and a session identifier. Also, the user's substantial log state may be exactly verified.

When at least two login messages are detected from the message buffer with respect to an identical user, the message processor 503 registers the at least two login messages to a forced logout candidate list.

In this instance, the forced logout candidate list is a temporary storage unit for processing the at least two log messages with respect to the identical user.

As an example, as shown in FIG. 7, when it is detected that the corresponding message is not retrieved from the user buffer 700, and at least two login messages with respect to the identical user are stored in the user buffer 700, the message processor 503 registers login messages of the log messages 702 and 703 to the forced logout candidate list 710.

The message processor 503 registers the at least two login messages with respect to the identical user, to the forced logout candidate list 710, and waits to process the at least two login messages.

When a logout message is received and the at least two login messages with respect to the identical user which are stored in the message buffer are reduced to one, the message processor 503 deletes the user's log message from the forced logout candidate list 710. As an example, when the logout message corresponding to the login message of the log message 702 is received, the message processor 503 deletes the login message of the log message 702 from both the user buffer 700 and the forced logout candidate list 710. As described above, when a corresponding message is received, login messages are reduced. However, when login messages with respect to an identical user are still at least two, the login message is not deleted from the forced logout candidate list 710.

The user forced logout unit 504 checks the forced logout candidate list 710 at a certain time interval, and when the at least two login messages with respect to the identical user are registered in the forced logout candidate list 710, selects one of the at least two login messages, and transmits a forced logout message to a service server of a channel corresponding to remaining login messages except for the selected login message.

In this instance, the certain time interval may be variously set. As an example, the user forced logout unit 504 may check whether at least two login messages with respect to the identical user are registered by checking the forced logout candidate list 710 every two seconds.

As an example, when the login messages 702 and 703 are registered in the forced logout candidate list 710, the user forced logout unit 504 selects the login message 702. With respect to the remaining login message 703 except for the selected login message 702, the user forced logout unit 504 transmits a forced logout message to a service sever of a channel "10" corresponding to the remaining login message 703.

The forced logout message may be a message which compulsorily terminates a user's login in a service server of the user's logged in channel, to make the user log out. Accordingly, the service server which receives the forced logout message may compulsorily terminate the user's access corresponding to the login message.

According to the present invention, concurrent user access messages with respect to an identical user are transmitted, and when a logout message with respect to any one of the concurrent user access messages is received, a login message corresponding to the logout message is deleted from the forced logout candidate list 710. Also, other remaining login messages are compulsorily terminated by transmitting a forced logout message. According, the concurrent user access messages may be effectively processed.

Specifically, when a user logs into a channel 1, and a service server of the channel 1 does not operate, the user may log into a channel 2. In this instance, according to the present invention, the login in the channel 2 is not compulsorily terminated. When the user logs out of the channel 2 and the forced logout message is transmitted to the channel 1, incorrect login information may be deleted.

When the service of the service server is a paid service, the user who logged into the channel 1 may be wrongfully charged. However, according to the present invention, it is possible to process the concurrent user access which may cause the wrong payment.

In this instance, the user forced logout unit 504 selects an earliest logged in login message from the at least two login messages with respect to the identical user, and transmits the forced logout message to a service server of a channel corresponding to remaining login messages of the at least two login messages.

As an example, the user forced logout unit 504 selects the initially logged in login message from the login messages 702 and 703 with respect to the identical user which are registered to the forced logout candidate list 710. Also, the user forced logout unit 504 transmits the forced logout message to a corresponding external server of the remaining login message.

The login message may include information which can determine a login order. As an example, the login message may include login time information. Also, the login message may include the time stamp 704 which can be used to identify the login order.

When the login message includes the time stamp 704, the time stamp 704 may include an identifier of the external server and sequence information with respect to a logged in order in the external server.

As an example, the login message 702 may include identifier information of the external server logged in by the user, "LCS 1", and sequence information which indicates the user's logged in order "77" in the external server "LCS 1", for the time stamp 704. Also, another login message 703 may include identifier information of the external server logged into by the user, "LCS 1", and sequence information which indicates the user's logged in order "78" in the external server "LCS 1", for the time stamp 704.

According to embodiments, the sequence information may be set to have a greater value according to a logged in order in the external server. As the sequence information has a smaller value, the log message may be a more initially logged in message.

The user forced logout unit 504 determines a login order of the login message which is registered to the forced logout candidate list 710, according to the time stamp 704. Also, the user forced logout unit 504 transmits the forced logout message to other remaining login messages except for an earliest logged in message of at least two login messages.

As an example, the user forced logout unit 504 may select the login message 702 which has a smallest time stamp value, and transmit a forced logout message to another login message 703 which is registered in the forced logout candidate list 710. Also, a server which receives the forced logout message may block the user's access in correspondence to the forced logout message.

According to the present invention, an earliest logged in login message may be selected from concurrent user access messages using a time stamp, and a forced logout message may be transmitted to other remaining login messages. Accordingly, a subsequent logged in login message may be accurately verified and thereby, the concurrent user access may be prevented.

The user location retrieval unit 505, in response to a request for location information of the user, retrieves the login message corresponding to the user from the message buffer, and transmits the channel identifier of the retrieved login message.

The request of location of the user may be transmitted in a predetermined message format by the concurrent login detection system. In response to the request, the user location retrieval unit 505 retrieves a user buffer corresponding to the user identifier which is included in the location request, and also retrieves the login message which is stored in the user buffer.

As an example, when location information is "SSS777", the user location retrieval unit 505 retrieves the user buffer corresponding to the user identifier, reads the channel identifier of the login message which is stored in the user buffer, and thereby, transmits the channel identifier to a server or a webpage which requested the location request. As an example, when the login message 702 is stored in the user buffer, the user location retrieval unit 505 reads the channel identifier "4", and transmits the same.

Generally, only a single login message is stored in the user buffer, and the channel identifier of the login message may be transmitted. However, at least two login messages may be stored. Specifically, according to an embodiment of the present invention, when the at least two login messages are stored in the message buffer, the user location retrieval unit 505 transmits a channel identifier of an earliest logged in login message among the at least two login messages. As an example, when the login messages 702 and 703 are stored in the message buffer, the user location retrieval unit 505 transmits the channel identifier "4" of the login message 702 which is the earliest logged in login message among the login messages 702 and 703.

According to another embodiment of the present invention, the user location retrieval unit 505 transmits a channel identifier of each of the at least two login messages.

The login order of the login message may be verified using the time stamp 704, which has been described above.

As described above, according to the present embodiment, a channel identifier and a time stamp is included in a login message for each user. Also, the login message is stored in a message buffer for each user. Accordingly, when the user logs in or double logs in, the user's current channel information may be quickly provided in response to a request for location of the user.

Figure 9:
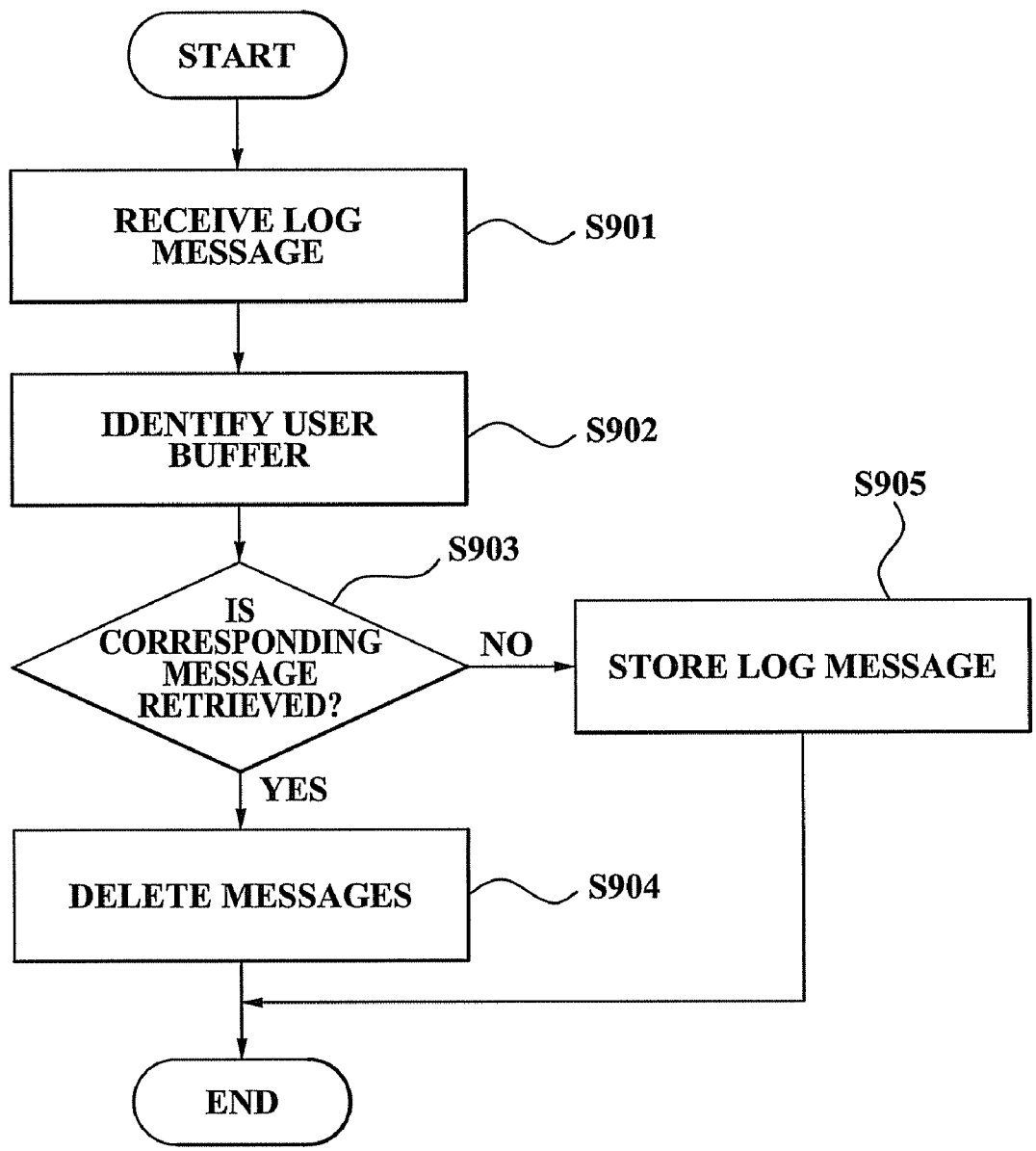
FIG. 9 is a flowchart illustrating a concurrent login detection method according to an embodiment of the present invention.

FIG. 9 is a flowchart illustrating a concurrent login detection method according to an embodiment of the present invention. Hereinafter, the concurrent login detection method according to the present embodiment will be described.

In operation S901, a concurrent login detection system according to the present invention receives a log message from an external service server. In this instance, the log message includes a user's user identifier, the user's login or logout state, a channel identifier of a channel which is logged in/logged out by the user, and a session identifier, which has been described above with reference to FIG. 6.

In operation S902, the concurrent login detection system identifies a user buffer corresponding to the user identifier in a message buffer by referring to the user identifier of the received log message.

As described above, the message buffer may include the user buffer which stores a predetermined message for each user identifier. Also, according to the present invention, the log message is stored in the user buffer for each user. Accordingly, even when login/logout messages are not received in order, the log message may be accurately processed by determining a corresponding message stored in the user buffer. An embodiment of the user buffer has been described with reference to FIG. 7.

In operation S903, the concurrent login detection system retrieves the corresponding message of the log message from the user buffer. The corresponding message is a log message having a user identifier, a channel identifier, and a session identifier identical to the log message, and having a user's login/logout state opposite to the log message. In this instance, the session identifier is a unique identifier which the external server assigns to a single session of the user, which has been described with reference to FIG. 6.

When the corresponding message is retrieved from the user buffer in operation S903, the concurrent login detection system deletes the log message and the retrieved corresponding message from the user buffer in operation S904.

When the corresponding message is not retrieved from the user buffer in operation S903, the concurrent login detection system stores the log message in the user buffer in operation S905.

Also, the concurrent login detection method according to the present invention may include retrieving the login message corresponding to the user from the message buffer, in response to a request for location information of the user, and transmitting a channel identifier of the retrieved login message. The transmission process with respect to the location request has been described above with reference to FIG. 5.

The concurrent login detection method according to the above-described embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

According to the present invention, there is provided a concurrent login detection method and system which can accurately determine a user's current login/logout state, although log messages transmitted from a plurality of service servers do not sequentially arrive at a location server in a transmission server, when aggregating and managing the user's login/logout information with respect to the plurality of service servers in the location server.

Also, according to the present invention, there is provided a concurrent login detection method and system which can maintain a message buffer for each user identifier, recognize a server identifier, a channel identifier, and a session identifier of a transmitted log message, and thereby, determine the user's concurrent logins, and also can detect a user who double logs in a distributed server via a single user identifier and utilizes a service.

Also, according to the present invention, there is provided a concurrent login detection method and system which can delete a log message corresponding to a logout message from a forced logout candidate list, and compulsorily terminate remaining concurrent user access messages by transmitting a forced logout message when at least two concurrent user access messages with respect to an identical user are transmitted, and in this instance, a logout message with respect to one of the at least two concurrent user access message is received, and thereby, can effectively process the concurrent user access messages.

Also, according to the present invention, there is provided a concurrent login detection method and system which can select an earliest logged in login message from double logged in messages using a time stamp, and force double logged-in users to be logged out by transmitting a forced logout message to remaining login messages, and thereby, can prevent a concurrent user access.

Also, according to the present invention, there is provided a concurrent login detection method and system which can maintain a user buffer storing a log message, which includes a server identifier, a channel identifier, and a session identifier, for each user identifier, and provide session identifier information of the user when a request for location of the user is received, and thereby, can provide location information of a server and a channel that a user is currently logged into and utilizes a service although users logged into a plurality of servers.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that relative terms are intended to encompass different orientations of the device in addition to the orientation depicted in the Figures.

Moreover, it will be understood that although the terms first and second are used herein to describe various features, elements, regions, layers and/or sections, these features, elements, regions, layers and/or sections should not be limited by these terms. These terms are only used to distinguish one feature, element, region, layer or section from another feature, element, region, layer or section. Thus, a first feature, element, region, layer or section discussed below could be termed a second feature, element, region, layer or section, and similarly, a second without departing from the teachings of the present invention.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Further, as used herein the term "plurality" refers to at least two elements. Additionally, like numbers refer to like elements throughout.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. Section 112, sixth paragraph, unless the element is expressly recited using the phrase "means for" or, in the case of a method claim, the element is recited using the phrase "step for."

What is claimed is:

1. A system for detecting concurrent logins, the system comprising:
    a message receiving unit configured to receive a log message which is indicative of a user identifier of a user, login/logout state of the user, and a session identifier, from an external server;
    a corresponding message retrieval unit configured to retrieve a corresponding message of the received log message from a memory, wherein the corresponding message is a log message containing the same user identifier and the same session identifier as contained in said received log message, and comprises a login/logout state of the user that is opposite to the login/logout state of the user in the received log message;
    a message processor configured to remove said received log message and said retrieved corresponding message from the memory if the corresponding message is retrieved from the memory, and to store said received log message in the memory if said corresponding message is not retrieved from the memory,
    wherein if the corresponding message is not retrieved from the memory, and if another log message is stored in the memory, the message processor registers the received log message and the another log message to a force logout candidate list, the received log message and the another log message both having the login state and the same user identifier.

2. The system of claim 1, wherein the session identifier is a unique identifier which the external server assigns to a single session of the user.

3. The system of claim 1, wherein:
    the memory includes a user buffer for each user, and
    the corresponding message retrieval unit identifies a user buffer corresponding to the user identifier stored in the memory by referring to the user identifier of said received log message, and retrieves the corresponding log message of said received log message, from the user buffer.

4. The system of claim 1, wherein the received log message and the another log message are at least two login messages detected from the memory with respect to the same user, and a login message is a log message which is indicative of a login state of the user.

5. The system of claim 4, wherein the message processor deletes the user's log message from the forced logout candidate list if said at least two login messages with respect to the same user which are stored in said memory are reduced to one by a received logout message, and the logout message is a log message which is indicative of a logout state of the user.

6. The system of claim 4, further comprising:
    a user forced logout unit configured for checking the forced logout candidate list at a certain time interval, and when the at least two login messages with respect to the identical user are registered in the forced logout candidate list, selecting one of the at least two login messages, and transmitting a forced logout message to a service server of a channel corresponding to a remaining login message except for the selected login message.

7. The system of claim 6, wherein the selected login message is a login message with an earliest login among the at least two login messages with respect to the same user.

8. The system of claim 6, wherein the login message comprises a time stamp, and the selected login message is a login message which has a smallest value of the time stamp among the at least two login messages with respect to the same user.

9. The system of claim 1, wherein the log message is indicative of a channel identifier of a channel logged into/logged out of by the user as well, and the received corresponding message contains the same channel identifier as well.

10. The system of claim 9, further comprising:
    a user location retrieval unit configured, in response to a request for location information of the user, for retrieving the login message corresponding to the user from the memory, and transmitting the channel identifier of the retrieved login message, the login message being a log message which is indicative of a login state of the user.

11. The system of claim 10, wherein the user location retrieval unit transmits the channel identifier of the login message with an earliest login among at least two login messages with respect to the user, when the at least two login messages are stored in the memory.

12. A method of detecting concurrent logins, the method comprising:
    receiving a log message from a service server wherein the log message is indicative of a user identifier of a user, login/logout state of the user, and a session identifier, from an external server;
    retrieving a corresponding message of the log message from a memory, wherein the corresponding message is a log message containing the same user identifier and the same session identifier as contained in said received log message, and comprises a login/logout state of the user opposite to the login/logout state of the user in the received log message;
    removing the received log message and the retrieved corresponding message from the memory if the corresponding message is retrieved from the memory, and storing the received log message in the memory if the corresponding message is not retrieved from the memory; and
    if the corresponding message is not retrieved from the memory, and if another log message is stored in the memory, registering the received log message and the another log message to a force logout candidate list, the received log message and the another log message both having the login state and the same user identifier.

13. The method of claim 12, wherein the session identifier is a unique identifier which the service server assigns to a single session of the user.

14. The method of claim 12, wherein the log message is indicative of a channel identifier of a channel logged into/logged out of by the user as well, and the received corresponding message contains the same channel identifier as well.

15. The method of claim 14, further comprising:
    retrieving the login message corresponding to the user from the memory, and transmitting the channel identifier of the retrieved login message, in response to a request for location information of the user, the login message being a log message which is indicative of a logout state of the user.

16. The method of claim 12, further comprising:
identifying a user buffer corresponding to the user identifier in the memory by referring to the user identifier of the received log message.

17. A non-transitory computer-readable storage medium comprising an executable program which when executed, causes performance of the following steps:
receiving a log message from a service server wherein the log message is indicative of a user identifier of a user, login/logout state of the user, and a session identifier, from an external server;
retrieving a corresponding message of the log message from a memory, wherein the corresponding message is a log message containing the same user identifier and the same session identifier as contained in said received log message, and comprises a login/logout state of the user opposite to the login/logout state in the received log message; and
removing the received log message and the retrieved corresponding message from the memory if the corresponding message is retrieved from the memory, and storing the received log message in the memory if the corresponding message is not retrieved from the memory; and
if the corresponding message is not retrieved from the memory, and if another log message is stored in the memory, registering the received log message and the another log message to a force logout candidate list, the received log message and the another log message both having the login state and the same user identifier.

\* \* \* \* \*